May 14, 1929.   G. W. HEBBELER   1,712,823
BATTERY CABLE CONNECTION
Filed May 7, 1926

INVENTOR
George W. Hebbeler
BY Cornwall, Bedell & James
ATTYS.

Patented May 14, 1929.

1,712,823

UNITED STATES PATENT OFFICE.

GEORGE WILLIAM HEBBELER, OF ST. LOUIS, MISSOURI.

BATTERY CABLE CONNECTION.

Application filed May 7, 1926. Serial No. 107,395.

My invention relates to battery and cable connections, and has for its general object the maintenance of a permanent reliable contact between these two elements.

Detail objects of my invention are to provide a connection which can be completed or separated easily, which will be adapted for cylindrical or tapered battery poles, which will include means for preventing sulphating of the normally exposed metallic parts, and which will be economical to manufacture.

In the accompanying drawings illustrating my invention—

Figure 2:
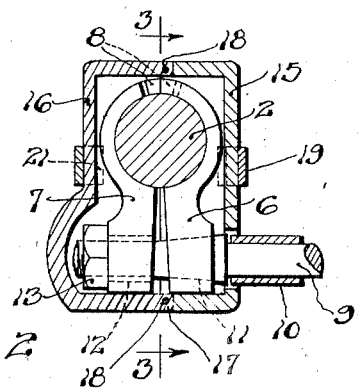
Figure 2 is a horizontal section taken on line 2—2 of Figure 1.
Figure 3:
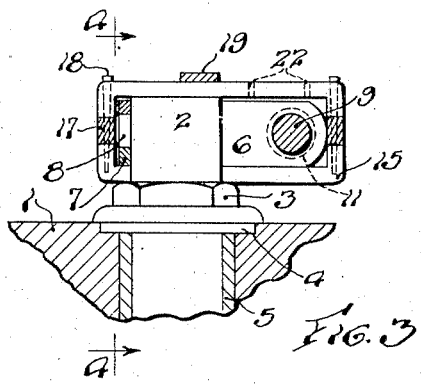
Figure 3 is a vertical section taken on line 3—3 of Figure 2.
Figure 1:
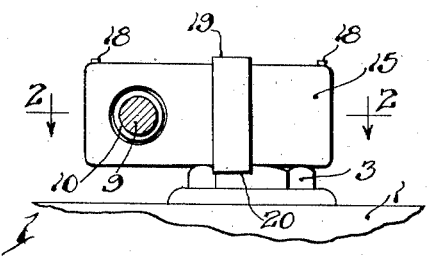
Figure 1 is a front elevation of my device completely assembled.

In the drawings, the battery case is indicated at 1 and one of the terminal poles is indicated at 2, the same being threaded at its lower portion for a nut 3 which clamps the pole tightly against the casing 1 of the battery, there being a gasket 4 and a bushing 5 beneath nut 3 whereby the interior of the battery is sealed against loss of electrolyte or escape of hydrogen around the pole 2.

Figure 4:
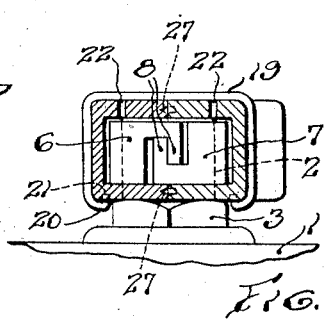
Figure 4 is a vertical section taken on line 4—4 of Figure 3.
Figure 7:
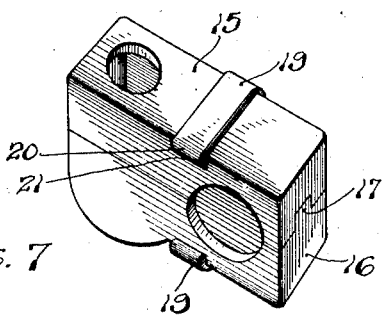
Figure 7 is an isometric view of my preferred housing device.

The pole contacting element of my combination is preferably formed of a pair of arms 6 and 7 having a pivotal connection at one end of a curved portion of each arm. A simple form of such connection is clearly illustrated in Figure 4 and comprises a projecting lug 8 formed on each of the arms, and a corresponding recess is provided on the adjacent arm. The opposite ends of the arms are preferably thickened and provided with openings for receiving the end of a cable 9 covered with the usual insulation 10 and having a tapered shouldered portion 11 and a cylindrical exteriorly threaded end portion 12. The opening in arm 6 is tapered so as to fit the tapered portion of the cable and the opening in arm 7 is large enough to permit the same to be moved toward arm 6 without any interference from the cable. A nut 13 is screwed onto cable portion 12 and serves to clamp the two arms tightly about the battery pole 2.

Figure 5:
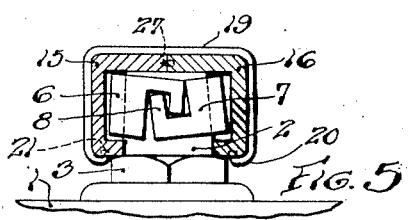
Figure 5 shows my device applied to a battery terminal pole having a taper.

The particular clamp shown is adapted to fit a cylindrical pole as indicated at 2 or to equally well fit a tapered pole as indicated at 14 in Figure 5, the recesses for projections 8 being large enough to permit the two arms to tilt relatively to each other in a vertical plane as well as in a horizontal plane.

In Figure 5 I illustrate to an exaggerated extent such tilting of the clamping members which permits them to fit a tapered battery pole as closely as a cylindrical post.

To exclude air from the pole 2, clamp arms and uninsulated portions of the cable, I provide a two-part housing consisting of pan-shaped elements 15 and 16, preferably having vertical meeting edges whereby the two elements may be applied to and removed from the battery pole and clamping arms without necessarily disassembling the latter. I indicate projecting lugs 17 on member 16 each entering a suitable recess in member 15 and serving to position the two members relatively to each other. I show pins 18 passing through lugs 17 and the adjacent wall portions of the lug receiving recesses for maintaining assembly of the housing elements 16 and 17. Suitable pins 27 may be provided on one of the elements and received in suitable recesses in the other element to assist in positioning the elements.

I also show an element holding strap 19, preferably formed of spring material and U-shaped to fit over three sides of the complete housing. The ends of the strap are flanged inwardly at 20 and are adapted to engage the bottom of the housing, and the bottom of the housing is preferably grooved or notched at 21 to more securely hold the flanges 20.

The housing elements may be made of fiber, wood, or other non-conducting material, and the housing elements are filled with cup grease, petroleum jelly, or similar material before being applied to the terminal members. Surplus filling material may be extruded through the openings 22 and wiped off.

Figure 6:
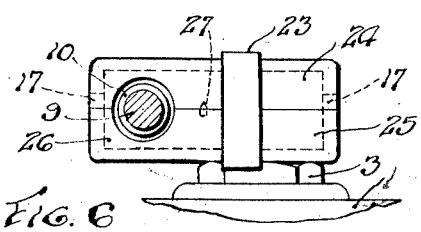
Figure 6 illustrates a modification of a detail of my invention.

In Figure 6 I illustrate a modification of my invention in which the housing is split horizontally and the two parts are held together by a strap 23 extending about three sides of the upper housing element 24 and engaging opposite sides of the lower housing element 25 with both of the inturned flanges of its ends gripping the bottom of the lower housing element.
The removal of the clamp after a long undisturbed period of application is rendered easy by my invention. When the clamp nut 13 is loosened the two clamp parts are easily separated and may be slipped off of the battery post without difficulty, thus avoiding the loosening or injury of the post and the plate to which it is attached as is often done with the ordinary connection in which the body must be bent, by prying the jaws apart, before its grip on the post will be relieved.

The terminal clamp elements illustrated are separately described and claimed in my copending application Serial No. 150,898, filed November 26, 1926, as a division hereof.

With my device, the objectionable sulphating of the battery and cable terminals may be prevented and the nuisance of replacing the cable or its clamp or nut at intervals is eliminated. Obviously details of my device may be changed without departing from the spirit of my invention, and I contemplate the exclusive use of such modifications of my invention as fall within the scope of my claims.

I claim:

1. In a battery terminal connection housing, an air excluding body for the battery pole and cable clamp comprising a pair of pan-like members having vertical meeting faces whereby said members may be applied to and removed from the pole and cable clamp without disconnecting the cable from the battery terminal, there being a laterally projecting lug on one of said faces and a corresponding recess on the other of said faces, and a pin passing through said lug and the adjacent walls of said recess for holding said members together.
2. In combination a battery post, a cable clamp secured thereto, and a housing for said post and clamp, said housing comprising a pair of pan-shaped members with their concave sides facing each other and meeting in a line extending longitudinally of the post to which the housing is applied, and means holding said members together comprising a strap of spring material engaging three sides of the housing and having its edges flanged inwardly and seated in recesses in the portions of said members forming the fourth side of the housing.

3. In a housing for a battery terminal pole and cable connection, a pair of pan-shaped members separable from each other and having their meeting edges disposed longitudinally of the battery pole, the lower sides of said members having cooperating notches for receiving the battery pole, and one of said members having an opening in one of its walls for receiving a cable and the other of said members having an outward bulge in its corresponding wall for enclosing the end of said cable.

4. In a storage battery terminal connection, a housing therefor comprising in combination a pair of pan-shaped members of insulating material having the edges of their side walls meeting to form a separable housing adapted to receive and enclose a battery and a cable terminal connection, there being a pair of circular openings formed in said housing and disposed in planes at right angles to each other for receiving respectively a battery post and a cable, one of said openings being formed in the wall of one of said members and the other opening being formed by cooperating semi-circular notches formed in the respective meeting edges of said pan-shaped members, and a U shaped clamp member of spring metal adapted to embrace three sides of said housing intermediate the ends thereof and hold said members in assembled relation, the ends of said clamp member being disposed laterally and inwardly for detachable engagement with recesses formed in the respective walls of said members.

5. In a storage battery terminal connection, a housing for enclosing the battery terminals, said housing comprising in combination a pair of pan-shaped members cooperating to form a hollow member closed on all sides and separable longitudinally, there being a pair of openings formed in the walls of said housing and disposed in planes at right angles to each other for receiving a battery post and a cable terminal, respectively, one of said openings being formed by cooperating semicircular notches formed in the meeting edges of the two pan-shaped members, and a U-shaped clamp member of resilient material adapted to embrace three walls of the assembled housing, the ends of said clamp member being turned inwardly for engagement with the fourth wall of said housing.

6. A housing for battery terminals comprising in combination a pair of pan-shaped members of insulation material cooperating to form a hollow member adapted to receive and wholly enclose the battery terminal and the cable terminal, said housing having a pair of openings formed in its walls in planes at right angles to each other for receiving a battery post and a cable terminal, respectively, one of said openings being formed by cooperating notches formed in the meeting edges of the two walls of said pan-shaped members, means for interlocking the meeting edges of said pan-shaped members to prevent lateral movement thereof relatively to each other, and a U-shaped clamp member adapted to resiliently embrace three walls of said assembled housing, the ends of said clamp member being disposed laterally in opposed relation to each other for engagement with recesses formed in the respective walls of said housing to prevent accidental displacement of said clamp member.

In testimony whereof I hereunto affix my signature this 30 day of April, 1926.

GEORGE WILLIAM HEBBELER.